United States Patent [19]

Engel

[11] 4,300,154
[45] Nov. 10, 1981

[54] COLOR DEMODULATION AND MATRIXING SYSTEM

[75] Inventor: Christopher M. Engel, Arlington Heights, Ill.

[73] Assignee: Zenith Radio Corporation, Glenview, Ill.

[21] Appl. No.: 161,839

[22] Filed: Jun. 23, 1980

[51] Int. Cl.$^3$ .............................................. H04N 9/50
[52] U.S. Cl. ........................................ 358/23; 358/30
[58] Field of Search ................................... 358/23, 30

[56] References Cited

U.S. PATENT DOCUMENTS 3,840,697 10/1974 Lunn ....................................... 358/23

Primary Examiner—Richard Murray

Attorney, Agent, or Firm—John H. Coult

[57] ABSTRACT

A color demodulation and matrixing system is disclosed for use in a color television receiver. The matrixing portion of the system receives R-Y and B-Y color-difference signals which may be developed by conventional demodulators. Each color-difference signal is converted to a pair of currents of opposing polarities which are coupled to a current node, and a load is coupled to the node for developing a G-Y voltage across the load. The demodulation portion of the system receives the R-Y and B-Y color-difference signals, converts each of them to currents of opposing polarities, and applies them to loads in push-pull fashion to develop R-Y and B-Y output voltages.

12 Claims, 3 Drawing Figures

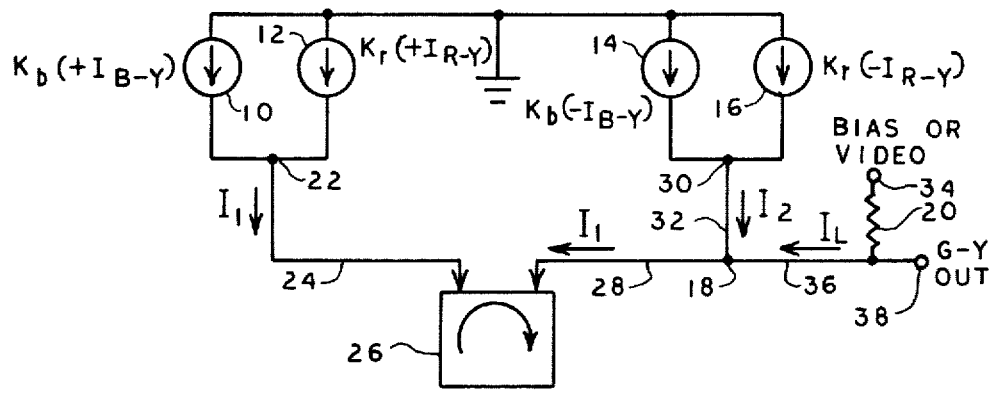
$G-Y = -2[K_r(I_{R-Y}) + K_b(I_{B-Y})]$   FIG. 1
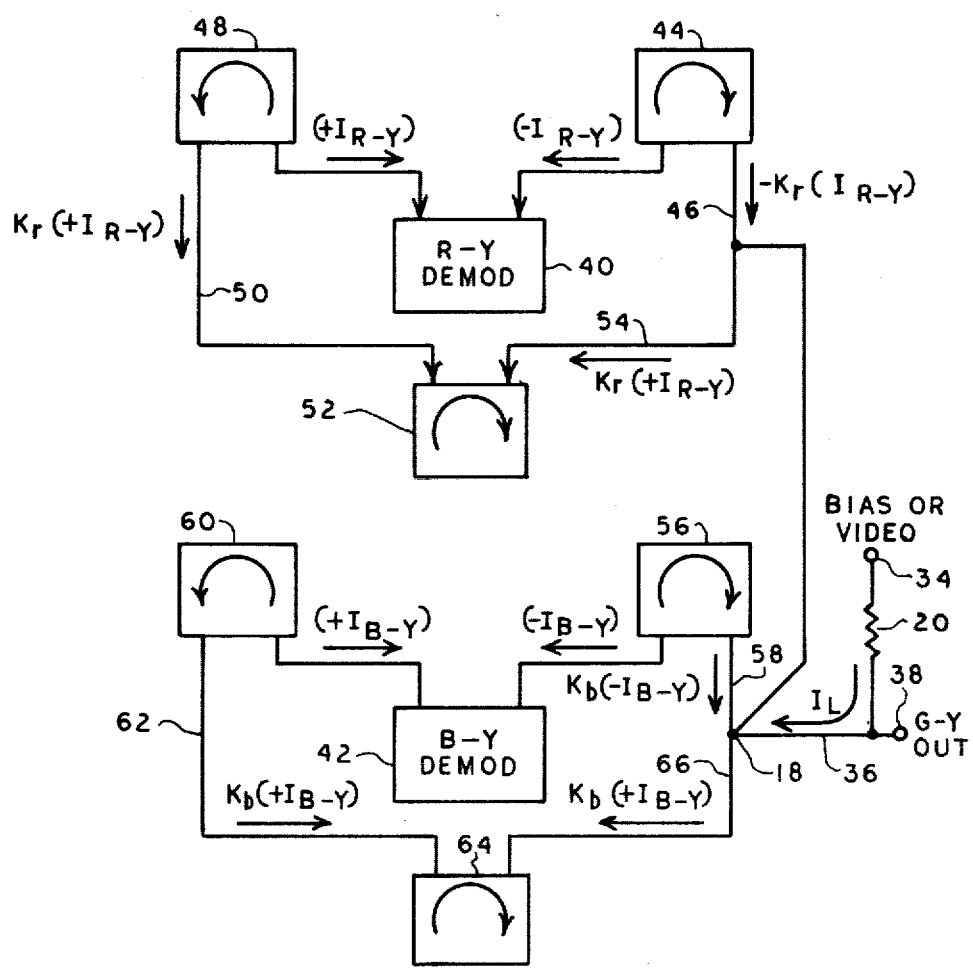
$I_L = +2K_b(I_{B-Y}) + 2K_r(I_{R-Y})$   FIG. 2

COLOR DEMODULATION AND MATRIXING SYSTEM

BACKGROUND OF THE INVENTION

This invention is directed generally to improvements in color television receivers, and particularly to color demodulation and matrixing of demodulated color-difference signals.

Many conventional color television receivers employ a B-Y demodulator and an R-Y demodulator for generating B-Y and R-Y color-difference signals from the color component of a received television signal. To develop a G-Y color-difference signal, the B-Y and R-Y color-difference signal is applied to a resistor matrix. The matrix adds the B-Y and R-Y signals in weighted proportions to develop an output voltage corresponding to the G-Y color-difference signal.

One problem with the resistor matrix approach described above is that the frequency response of the G-Y color-difference signal is degraded. The typically large value resistors and their associated capacitances cause the G-Y signal to roll off at an undesirably low frequency.

Another problem associated with typical resistor matrixes is that they tend to produce G-Y signals having a D.C. component which is different from the D.C. component associated with the R-Y and B-Y signals. In addition, the D.C. component of the G-Y signal tends not to track with the D.C. components of the B-Y and R-Y signal with temperature variations.

Yet another drawback of prior demodulation systems has been their inability to develop color-difference signals having an amplitude which is as large as desired.

Because of the problems mentioned above, prior demodulation and matrixing systems have proven to be less then perfectly satisfactory. The fact tha the G-Y signal tends to have a D.C. component which is different from and which does not track with the D.C. components of the other color-difference signals makes it difficult to D.C. couple the color-difference signals to further stages of color-difference amplifiers.

OBJECTS OF THE INVENTION

It is a general object of the invention to provide an improved color-difference demodulation and G-Y matrixing system.

It is a more specific object of the invention to provide such a system wherein th G-Y signal is developed by matrixing the R-Y and B-Y color-difference signals such that a G-Y signal is developed whose frequency response is not degraded and whose D.C. component, if any, matches and tracks with the D.C. components of the other color-difference signals.

It is a further object of the invention to provide such a system in which relatively large amplitude color-difference signals are developed.

BRIEF DESCRIPTION OF THE FIGURES

The objects stated above and other objects of the invention are more particularly set forth in the following detailed description and in the accompanying drawings of which:

FIG. 1 is a schematic representation of a matrixing system in accordance with the invention for developing a G-Y color-difference signal;

FIG. 2 shows schematically how to couple a B-Y and a R-Y demodulator in the matrixing arrangement of FIG. 1.

DESCRIPTION OF THE PREFERRED EMBODIMENT

Figure 3:
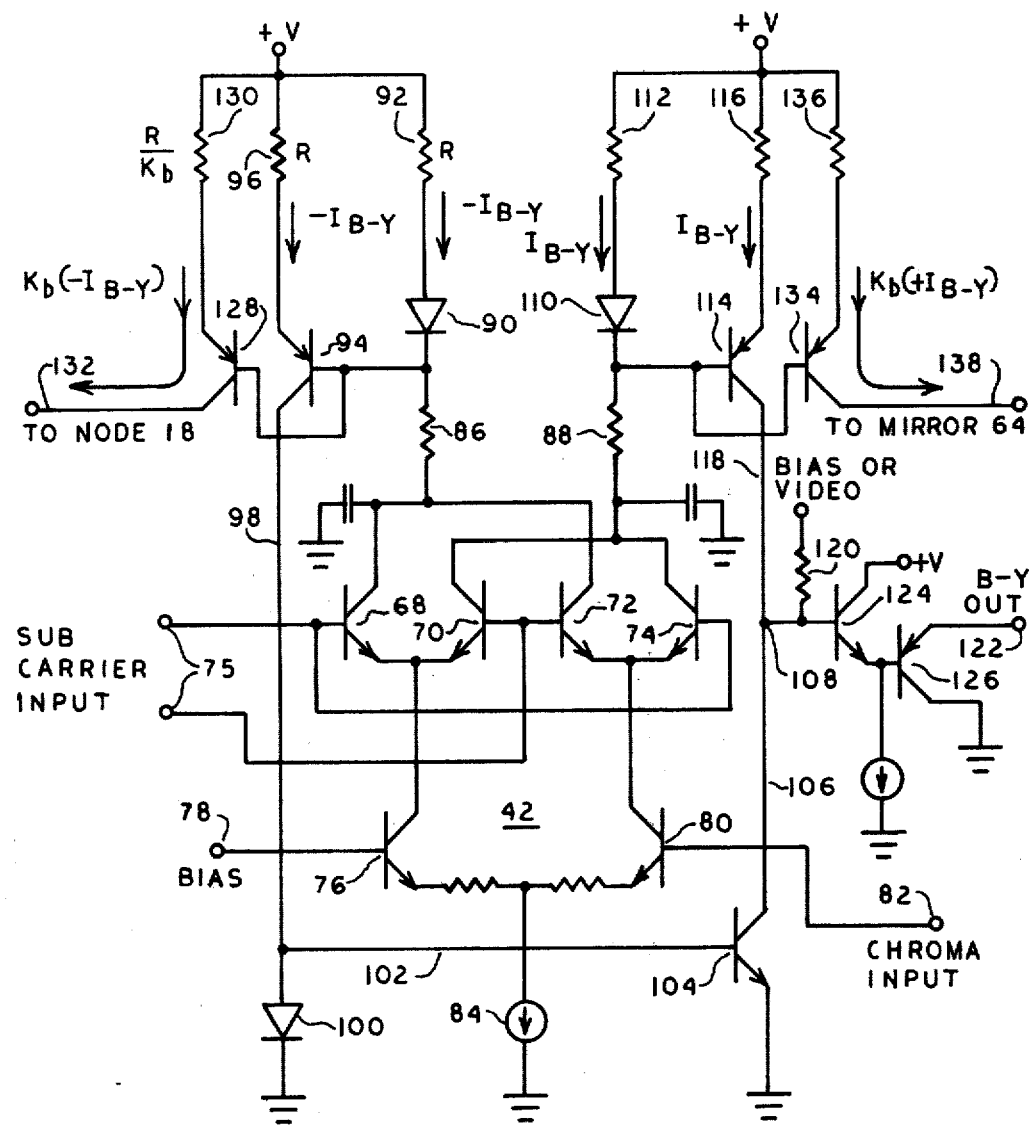
FIG. 3 is a circuit diagram of an exemplary color demodulator for use in the arrangement illustrated in FIG. 2.

Referring to FIG. 1, a schematic illustration of a matrixing system is shown for developing a G-Y color-difference signal according to one aspect of the invention. The illustrated matrixing system includes current sources 10, 12, 14 and 16 for applying to a current node 18 currents representative of conventional, but weighted R-Y and B-Y color-difference signals of the type developed by conventional R-Y and B-Y demodulators. Generally, the currents are summed at the node 18 such that a relatively large amplitude G-Y voltage is developed across a G-Y load resistor 20 and such that D.C. components associated with the R-Y and B-Y signals are cancelled from the G-Y voltage.

Specifically, the source 10 may provide a current representative of a B-Y signal of positive polarity and weighted by a factor $K_b$. Hence, the current developed by the source 10 is indicated in FIG. 1 as being equal to $K_b(+I_{B-Y})$.

The current provided by the source 10 may be developed from the output of a conventional demodulator, as may the currents supplied by the sources 12, 14 and 16. As described below, all the sources 10–16 preferably take the form of current mirrors which are responsive to R-Y and B-Y signals developed by color-difference demodulators for generating currents having predetermined polarities and weighting factors.

The source 12, as shown, preferably provides a current representative of an R-Y signal of a positive polarity and weighted by a factor $K_r$. The resulting current is indicated as being equal to $K_r(+I_{R-Y})$.

The currents developed by the sources 10 and 12 are coupled to a node 22 such that a resultant current $I_1$, equal to the sum of the currents developed by sources 10 and 12, flows in a lead 24. A current mirror 26 receives the current $I_1$ via lead 24 and mirrors the current $I_1$ in an output lead 28 so that the current $I_1$ flows away from the node 18. Thus, weighted R-Y and B-Y currents of a positive polarity flow away from the node 18 as indicated by the direction of the current $I_1$ in lead 28.

The source 14 preferably provides a current representative of the B-Y signal, weighted similarly to the current supplied by the source 10, but of opposite (negative) polarity. Hence, the current provided by the source 14 is indicated as being equal to $K_b(-I_{B-Y})$.

The source 16 preferably provides a current representative of the R-Y signal, weighted similarly to the current supplied by the source 12, but of opposite polarity. As shown in FIG. 1, the current provided by the source 16 is equal to $K_r(-I_{R-Y})$.

The currents developed by the sources 14 and 16 are coupled to a node 30 such that a resultant current $I_2$, equal to the sum of the currents from sources 14 and 16, flows in a lead 32 toward the current node 18. Thus, weighted B-Y and R-Y currents of a negative polarity flow toward the node 18.

The G-Y load 20 may be coupled via terminal 34 to a suitable source of D.C. bias, the other end of the load 20 being coupled via a lead 36 to the current node 18. With this arrangement, a current $I_L$ flows in the load 20 and the lead 36, which current is equal to $I_1$ minus $I_2$. If the indicated values of the currents supplied by the sources 10-16 are substituted for $I_1$ and $I_2$, it can be shown that the load current $I_L$ is equal to $+2 K_b(I_{B-Y}) + 2K_r(I_{R-Y})$. By suitable selection of the weighting factors $K_b$ and $K_r$, the load current $I_L$ corresponds to a $-(G-Y)$ signal. Hence, the node 18 may be coupled to a terminal 38 for outputting the G-Y voltage developed across the load 20 by the current $I_L$.

In practice, the factor $K_b$ may be selected to be approximately 0.30 and the factor $K_r$ may be selected to be approximately 0.10.

Among the advantages of the illustrated matrixing system is the fact that no large impedances are used to develop the G-Y output voltage. Hence, the frequency response of the G-Y output signal is not degraded.

Further, because the illustrated arrangement provides currents $I_1$ and $I_2$ which are coupled to the current node 18 in a so-called "push-pull" fashion, a relatively large amplitude G-Y voltage is developed at the output terminal 38.

An additional advantage of this matrixing system is that the G-Y output voltage contains substantially no D.C. component associated with R-Y and B-Y color-difference signals. Hence, the G-Y output voltage at terminal 38 does not include a D.C. component which could vary with temperature, and it may be D.C. coupled to one or more further stages of amplification.

D.C. components of the B-Y and R-Y signals are not present in the load current $I_L$ because the currents $I_1$ and $I_2$ are developed such that they each include equal amounts of the D.C. components which may be associated with the R-Y and B-Y signals. That is, whatever D.C. components are included in $I_1$ flow away from the current node 18, and substantially equal D.C. components in $I_2$ flow toward the node 18. Consequently, no remaining D.C. components are available for inclusion in the load current $I_L$.

A preferred circuit arrangement for developing such currents is described hereinafter. In addition, a demodulation system is described for developing, from conventional demodulators, R-Y and B-Y output voltages having the above-stated characteristics of the G-Y output voltage, namely, a large amplitude and substantially no D.C. components.

It should also be noted with reference to FIG. 1 that terminal 34 may be coupled to a source of video (luminance) in order to generate a Green output signal at terminal 38 rather than a color-difference signal.

FIG. 2 illustrates, according to another aspect of the invention, an arrangement by which a conventional R-Y demodulator 40 and a conventional B-Y demodulator 42 are preferably coupled with a G-Y matrixing system of the type shown in FIG. 1. Elements of FIG. 2 which correspond to elements of FIG. 1 have been given corresponding reference numerals.

As shown, a first current mirror 44 is coupled to the demodulator 40 and, via lead 46, to the current node 18 for developing a weighted R-Y current of a first or negative polarity. In this particular embodiment, the current mirror 44 senses a current $-I_{R-Y}$ associated with an R-Y signal developed by the demodulator 40 and mirrors a similar but weighted current, $-K_r(I_{r-y})$ to the node 18. The current in the lead 46, therefore, corresponds to the current provided by the source 16 of FIG. 1.

A second current mirror 48 is coupled to the demodulator 40 and, via a lead 50, to a third current mirror 52 for developing a weighted R-Y current of a second or positive polarity. Similarly to mirror 44, the mirror 48 senses a current $(+I_{R-Y})$ associated with a positive R-Y signal developed by the demodulator 40 and mirrors a similar but weighted current, $K_r(+I_{R-Y})$, into the lead 50. The current thus developed in the lead 50 corresponds to the current provided by the source 12 of FIG. 1.

The current mirror 52 responds to the current in the lead 50 so as to provide a similar current in its output lead 54 flowing in the direction indicated. The lead 54 is coupled as shown to the current node 18 so that a current corresponding to $K_r(+I_{R-Y})$ flows away from the node 18.

A fourth current mirror 56 is coupled to the B-Y demodulator 42 and, via a lead 58, to the node 18 for developing a weighted B-Y current of a first or negative polarity in the lead 58. The latter current may be developed by the mirror 56 sensing a current $-I_{B-Y}$ associated with a B-Y signal developed by the demodulator 42, and mirroring a similar but weighted current in the lead 58 for coupling to the node 18. The current $K_b(-I_{B-Y})$ thus flowing toward the node 18 corresponds to the current provided by the source 14 of FIG. 1.

A fifth current mirror 60 is coupled to the B-Y demodulator and, via a lead 62, to a sixth current mirror 64 for generating in the lead 62 a weighted B-Y current of a second or positive polarity. This current may be developed by the mirror 60 sensing a current $(+I_{B-Y})$ associated with a positive B-Y signal developed by the B-Y demodulator and mirroring a similar but weighted current into the lead 62.

In response to the current in the lead 62, the current mirror 64 mirrors a similar current $I_b(+I_{B-Y})$ into a lead 66 which is coupled to the node 18 so that the latter current flows away from the node 18. Thus, current thus developed by the current mirror 64 corresponds to the current provided by the source 10 of FIG. 1.

To develop a G-Y output voltage, the load 20 is coupled via the terminal 34 to a bias source and coupled via the lead 36 to the node 18. With this arrangement, the weighted color-difference currents flow toward and away from the node 18 in the same manner as in FIG. 1, a corresponding load current $I_L$ is developed through the load 20, and the G-Y output voltage is developed at the terminal 38.

Referring now to FIG. 3, a circuit diagram of the B-Y demodulator 42 is shown, along with a preferred arrangement of current mirrors to develop a large amplitude B-Y output voltage having substantially no D.C. component, and to develop weighted B-Y currents for application to the G-Y matrixing system.

The demodulator itself may conventionally include transistors 68, 70, 72 and 74 coupled as shown to form two differential amplifiers. The bases of the transistors 68-74 are coupled to input terminals 75 for receiving a 3.58 MHz subcarrier signal.

A transistor 76 may be coupled via a terminal 78 to a suitable source of bias to supply current to the emitters of transistors 68 and 70. Another transistor 80 may be coupled via a terminal 82 to a 3.58 MHz chroma source for supplying current to the emitters of transistors 72 and 74. A source 84 of D.C. Current may supply operating current to the emitters of transistors 76 and 80.

The differential amplifiers defined by transistors 68-74 are cross-coupled at their collectors in the conventional manner to develop a $-(B-Y)$ current through a collector resistor 86 and a +(B-Y) current through another collector resistor 88.

To develop push-pull B-Y currents for generating a relatively large amplitude B-Y output voltage, the collector resistor 86 is coupled to a diode 90 which is, in turn, coupled via a resistor 92 to a source of operating voltage. The current through the resistor 92 and the diode 90 is indicated as $-I_{B-Y}$.

The cathode of the diode 90 is coupled to the base of a transistor 94, the emitter of which is coupled through a resistor 96 to the operating voltage. The resistors 92 and 96 are preferably selected such that the value of the resistor 92 is three times the value of resistor 96 to obtain current gain. Hence, a larger amplitude current having a polarity corresponding to $(-I_{B-Y})$ flows in the lead 98.

The lead 98 couples the current from transistor 94 to another diode 100 which is grounded at its cathode. The anode of the diode 100 is coupled by a lead 102 to the base of a grounded-emitter transistor 104. The collector of the transistor 104 is coupled by a lead 106 to a node 108, whereby the current in the lead 106 corresponds to the current flowing in the lead 98, namely, $(-I_{B-Y})$.

A B-Y current of the opposite polarity $(I_{B-Y})$ flows in the collector resistor 88. That resistor is coupled through a diode 110 to a resistor 112 and thence to a source of operating voltage.

A transistor 114 is connected at its base to the cathode of the diode 110 and at its emitter to a resistor 116. The values of the resistors 112 and 116 preferably have the same relationship as the resistors 92 and 96 so that the transistor 114 generates in its collector lead 118 an amplified current $(I_{B-Y})$.

With the lead 118 coupled to the node 108 as shown, a current corresponding to $(I_{B-Y})$ is directed toward the node 108, whereas a current corresponding to $(-I_{B-Y})$ is directed away from the node 108 by the transistor 104.

A B-Y load resistor 120 is coupled at one end to a source of bias and at its other end to the node 108. With this arrangement, the push-pull B-Y currents applied to the node 108 cause a relatively large amplitude B-Y voltage to be developed across the load 120. That voltage may be coupled to a B-Y output terminal 122 by means of output circuitry comprising transistors 124 and 126.

Because the push-pull currents which are coupled to the node 108 include substantially equal D.C. components, those components cancel each other so that the current through the load 120 includes substantially only A.C. color-difference components. Hence, the B-Y output voltage may readily be D.C. Coupled to one or more further stages of amplification. In addition, the B-Y output voltage is substantially temperature invariant because of its lack of a D.C. component.

To develop a weighted minus B-Y current for use in the G-Y matrixing system, another current mirror in the form of a transistor 128 and a resistor 130 is coupled as shown to the transistor 94. The transistor 128 is preferably constructed so that its area is smaller by the weighting factor $K_b$ than the area of the transistor 94. Also, the resistor 130 is preferably selected to have a value of $R/K_b$, where R is the value of the resistor 96. Thus, the transistor 128 mirrors into its collector lead 132 a current corresponding to $K_b -(I_{B-Y})$.

The lead 132 corresponds to the lead 58 of FIG. 2 and may be coupled to the node 18 to direct a current corresponding to $K_b-(I_{B-Y})$ toward the node 18.

To develop a weighted positive B-Y current, another current mirror in the form of a transistor 134 and a resistor 136 is coupled as shown to the transistor 114. The transistor 134 is preferably constructed so that its area is smaller by the factor $K_b$ than the area of the transistor 114. Also, the resistor 136 is preferably selected to have a value of $R/K_b$. Thus, the transistor 134 mirrors into its collector lead 138 a current corresponding to $K_b (I_{B-Y})$.

The lead 138 corresponds to the lead 62 of FIG. 2 and may be coupled to a conventional current mirror 64.

It will be understood that an R-Y demodulator similar to the B-Y demodulator of FIG. 3 will be included in a complete demodulation and matrixing system. Such an R-Y demodulator preferably is coupled to current mirrors such as those provided by transistors 94, 104 and 114 for developing push-pull R-Y currents. The push-pull currents will be coupled to a current node and to an R-Y load in a manner similar to that of FIG. 3.

In addition, such an R-Y demodulator will preferably be coupled to current mirrors of the type formed by transistors 128 and 134 in FIG. 3 to generate weighted positive and negative R-Y currents. Of course, the areas of transistors corresponding to transistors 128 and 134 will be adjusted in accordance with the factor $K_r$ rather than $K_b$. Likewise, resistors corresponding to resistors 130 and 136 will be similarly adjusted. The resultant R-Y demodulator may then be coupled with the G-Y matrixing system in the manner shown in FIG. 2.

Although the invention has been described in terms of preferred structure, it will be obvious to those skilled in the art that many alterations and modifications thereto may be made to suit a particular application or design preference. For example, the resistors 92, 96, 112, 116, 130 and 136 in FIG. 2 may be omitted. Their inclusion is preferred, however, to stabilize the currents developed by the transistors or diodes to which they are connected. Other types of current mirrors may also be employed, to mention but another example. Accordingly, it is intended that all such modifications and alterations be considered as within the spirit and scope of the invention as defined by the appended claims.

What is claimed is:

1. In a color television receiver, a color demodulation and matrixing system, comprising:
    demodulation means for developing the R-Y and B-Y color-differenec signals;
    means for converting the R-Y color-difference signal to first and second R-Y currents of opposing polarities, and for converting the B-Y color-difference signal to first and second B-Y currents of opposing polarities; and
    means for coupling said first and second R-Y currents and said first and second B-Y currents to a load such that a resulting current which corresponds to a G-Y color-difference signal is developed through the load.

2. A system as set forth in claim 1 wherein said first and second R-Y and B-Y currents are coupled to the load such that any D.C. components associated with the R-Y and B-Y currents are of opposite, cancelling polarities in the load.

3. A system as set forth in claim 1 wherein said converting means is adapted to weight the R-Y currents relative to the B-Y currents by a constant, predetermined factor.

4. a system as set forth in claim 1 wherein said converting means includes means coupling all the R-Y and B-Y currents to a current node such that the R-Y and B-Y currents of said first polarity flow toward the current node and such that the R-Y and B-Y currents of said second polarity flow away from said current node, and including means for coupling the load to the current node such that any D.C. components associated with the R-Y and B-Y currents are of opposite, cancelling polarities in the load.

5. A system as set forth in claim 4 wherein said demodulating means includes an R-Y demodulator and a B-Y demodulator and said converting means includes:
   at least one current mirror coupled to the R-Y demodulator and to the current node for developing an R-Y current of said second polarity flowing away from the current node; and
   at least another current mirror coupled to the B-Y demodulator and to the current node for developing a B-Y current of said second polarity flowing away from the current node.

6. A system as set forth in claim 5 wherein said converting means further includes:
   a current mirror responsive to the R-Y signal developed by the R-Y demodulator for developing an R-Y current of said first polarity flowing toward the current node; and
   another current mirror responsive to the B-Y signal developed by the B-Y demodulator for developing a B-Y current of said first polarity flowing toward the current node.

7. A system as set forth in claim 4 including means responsive to the R-Y signal for developing R-Y currents of opposite polarities and for coupling said currents to an R-Y load in push-pull fashion so as to develop a relatively large amplitude R-Y output voltage having substantially no D. C. component.

8. A system as set forth in claim 7 further including means responsive to the B-Y signal for developing B-Y currents of opposite polarities and for coupling said B-Y currents to a B-Y load in push-pull fashiong so as to develop a relatively large amplitude B-Y output voltage having substantially no D.C. component.

9. In a color television receiver having demodulators producing R-Y and B-Y color-difference signals, a system for developing large amplitude, mutually tracking R-Y, B-Y and G-Y color-difference voltages, comprising:
   means responsive to the R-Y signal for developing R-Y currents of opposite polarities and for coupling said currents to an R-Y load in push-pull fashion so as to develop a relatively large amplitude R-Y output voltage, in which D. C. components associated with the R-Y signal appear in opposite, cancelling polarities in the R-Y load;
   means responsive to the B-Y signal for developing B-Y currents of opposite polarities and for coupling said B-Y currents to a B-Y load in push-pull fashion so as to develop a relatively large amplitude B-Y output voltage in which D.C. components associated with the B-Y signal appear in opposite, cancelling polarities in the B-Y load; and
   means for coupling opposing polarities of R-Y and B-Y currents to a G-Y load such that a relatively large amplitude voltage which corresponds to a G-Y color-difference signal is developed across the G-Y load, and such that D.C. components associated with the R-Y and B-Y signals are excluded from the G-Y color-difference signal.

10. A system as set forth in claim 9 wherein the R-Y currents which are coupled to the G-Y load are weighted by a constant, predetermined factor relative to the B-Y currents which are coupled to the G-Y load.

11. A system as set forth in claim 9 wherein said coupling means includes:
    means for deriving, from the R-Y and B-Y color-difference signals, weighted R-Y and B-Y currents of a first polarity and for coupling the weighted currents to a current node such that they flow toward the node;
    means for deriving similarly weighted R-Y and B-Y currents of a second, opposite polarity and for coupling the latter currents to the current node such that they flow away from the node; and
    means for coupling the G-Y load to the current node.

12. In a color television receiver, a color demodulation and matrixing system, comprising:
    an R-Y demodulator for developing an R-Y color-difference signal;
    a B-Y demodulator for developing a B-Y color-difference signal.
    a first current mirror coupled to the R-Y demodulator for developing a weighted R-Y current of a first polarity and for coupling the R-Y current to a current node such that the latter current flows toward the node;
    a second current mirror coupled to the R-Y demodulator for developing a similarly weighted R-Y current but of a second, opposite polarity;
    a third current mirror receiving the R-Y current of said second polarity for mirroring the latter current to the current node such that the mirrored current flows away from the node;
    a fourth current mirror coupled to the B-Y demodulator for developing a weighted B-Y current to said first polarity and for coupling the B-Y current to the current node such that the latter current flows toward the node;
    a fifth current mirror coupled to the B-Y demodulator for developing a similarly weighted B-Y current but of said second, opposite polarity;
    a sixth current mirror receiving the B-Y current of said second polarity for mirroring the latter current to the current node such that the mirrored B-Y current flows away from the node;
    means for coupling a G-Y load to the current node such that the R-Y and B-Y currents which are coupled to the node cause a G-Y voltage to be developed across the G-Y load;
    means responsive to the R-Y signal for developing a pair of further R-Y currents;
    means for coupling said further R-Y currents in push-pull fashion to an R-Y load so as to develop a relatively large amplitude R-Y output voltage across the R-Y load;
    means responsive to the B-Y signal for developing a pair of further B-Y currents; and
    means for coupling said further B-Y currents in push-pull fashion to a B-Y load so as to develop a relatively large amplitude B-Y output voltage across the B-Y load.

* * * * *